M. C. SCHWEINERT.
STOPPER.
APPLICATION FILED AUG. 21, 1915.
1,310,448.
Patented July 22, 1919.
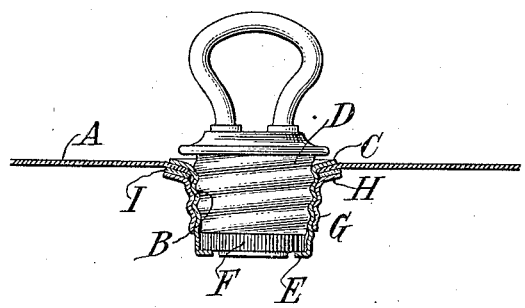
WITNESSES:
Rene Spuine
Fred White
INVENTOR:
Maximilian Charles Schweinert,
By Attorneys,
Fraser, Dunk & Myers

UNITED STATES PATENT OFFICE.

MAXIMILIAN CHARLES SCHWEINERT, OF WEST HOBOKEN, NEW JERSEY.

STOPPER.

1,310,448.     Specification of Letters Patent.     Patented July 22, 1919.

Application filed August 21, 1915. Serial No. 46,594.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Stoppers, of which the following is a specification.

This invention relates to stoppers which are particularly adapted for flexible bathtubs or similar devices. The invention is specially directed to a means for securing the socket of the stopper to the tub. Such tubs are usually made of thin rubber cloth and there has heretofore been difficulty in securing the socket to it. According to the present invention I provide a socket member having at its top a flange which fits the exterior of the fabric, the socket member being formed with internal and external threads. Around the exterior of the socket member I provide a screw threaded sleeve which is formed with a similar flange designed to bear against the underside of the fabric. By screwing up the sleeve the fabric is clamped between the two flanges, thus securely holding the socket member in place with a leak-tight joint. Preferably a packing ring is introduced between the two flanges and such packing will usually bear against the under surface of the packing.

The drawing, which illustrates one form of the invention, shows a diametrical section of the socket member and its retaining sleeve, the stopper being shown in elevation.

Referring to the drawing let A indicate the bottom wall of a flexible container such as a bath-tub, which wall is formed with a circular hole in which the socket member B is arranged. The socket member is formed with a flange C of greater diameter than the opening, and which is adapted to overlie the wall A. The socket member B is provided with an internal thread designed to receive an external thread on the stopper D. It is also formed with an inturned flange E which acts as a seat for the packing F carried at the bottom of the stopper.

The socket member B is also formed with an external thread which is adapted to receive a threaded sleeve G having at its upper end a flange H, which is similar to the flange C of the socket member and by tightening the sleeve G the fabric is clamped between the two flanges. I preferably interpose a packing ring I between the flanges and this is ordinarily arranged between the flange H and the fabric as shown. The packing I by reason of its compressibility forms a cushion for the fabric so that the latter is not directly clamped between two metal surfaces.

For economy and simplicity I prefer to construct the socket member B of sheet metal and to roll the threads in the wall thereof so that by a single operation the internal and external threads are formed. The sleeve G is also preferably of sheet metal.

The invention is applicable not only to flexible tubs but also other containers such as water bottles, ice bags or the like.

While I have shown and described one form of the invention I do not wish to be limited thereto since various changes may be made therein without departing from the invention.

What I claim is:

1. The combination with a stopper for rubber bath tubs or the like, of a socket member comprising a sheet metal body having its outermost end turned outwardly to form a flange, and having its body portion bent to form an internal and external thread to receive the stopper, and its innermost end extended inwardly to form an internal seat for the base of the stopper, and a sheet metal screwthreaded sleeve adapted to screw on the outside of said socket member from its inner end outwardly, and to compress the edges of the bath tub or the like against said socket flange at the outermost end, said screwthreaded sleeve having an outwardly-extending flange to coöperate with said socket flange.

2. The combination with a stopper for rubber bath tubs or the like, of a socket member comprising a sheet metal body having its outermost end turned outwardly to form a flange adapted to engage the outer surface of, and lie substantially flush with, the bath tub or the like to which it is attached, and having its body portion bent to form an internal and external thread to receive the stopper, and its innermost end extended inwardly to form an internal seat for the base of the stopper, and a sheet metal screwthreaded sleeve adapted to screw on the outside of said socket member from its inner end outwardly, and to compress the edges of the bath tub or the like, against said socket flange at the outermost end, said screwthreaded sleeve having an outwardly-extending flange to coöperate with said socket flange, and a compressible packing gasket arranged between the flange on the sleeve and the inner side of the bath tub, and adapted to be pressed against the latter.

In witness whereof, I have hereunto signed my name in the presence of two subscribing witnesses.

MAXIMILIAN CHARLES SCHWEINERT.

Witnesses:
GRACE GUNDERMAN,
FRED WHITE.